United States Patent
Gudla et al.

(10) Patent No.: US 12,339,915 B2
(45) Date of Patent: Jun. 24, 2025

(54) CONTEXTUAL BANDIT MODEL FOR QUERY PROCESSING MODEL SELECTION

(71) Applicant: Maplebear Inc., San Francisco, CA (US)

(72) Inventors: Vinesh Reddy Gudla, South San Francisco, CA (US); David Vengerov, San Jose, CA (US); Tejaswi Tenneti, San Carlos, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/496,724

(22) Filed: Oct. 27, 2023

(65) Prior Publication Data
US 2025/0139176 A1    May 1, 2025

(51) Int. Cl.
*G06F 16/95* (2019.01)
*G06F 16/9532* (2019.01)
*G06Q 30/0201* (2023.01)
*G06Q 30/0282* (2023.01)
*G06Q 30/0601* (2023.01)

(52) U.S. Cl.
CPC ..... *G06F 16/9532* (2019.01); *G06Q 30/0201* (2013.01); *G06Q 30/0282* (2013.01); *G06Q 30/0635* (2013.01)

(58) Field of Classification Search
None
See application file for complete search history.

(56) References Cited

U.S. PATENT DOCUMENTS

| | | | | |
|---|---|---|---|---|
| 11,004,135 | B1 * | 5/2021 | Sandler | G06Q 30/0631 |
| 11,477,142 | B1 * | 10/2022 | Lewis | G06F 40/30 |
| 11,763,350 | B2 * | 9/2023 | Verma | G06Q 30/0277 705/14.54 |
| 11,776,011 | B2 * | 10/2023 | Yang | G06Q 30/0257 705/14.55 |
| 11,797,624 | B2 * | 10/2023 | Iyer | G06F 16/90344 |
| 12,131,365 | B2 * | 10/2024 | Forsyth | G06N 3/04 |
| 12,141,852 | B2 * | 11/2024 | Raziperchikolaei | G06Q 30/0255 |
| 12,169,512 | B2 * | 12/2024 | Hamilton | G06F 16/3334 |
| 12,211,073 | B2 * | 1/2025 | Shi | G06F 18/2148 |
| 2008/0140591 | A1 * | 6/2008 | Agarwal | G06F 16/951 707/E17.108 |
| 2011/0264639 | A1 * | 10/2011 | Slivkins | G06F 16/9532 707/723 |
| 2015/0095271 | A1 * | 4/2015 | Ioannidis | G06N 7/01 706/12 |
| 2018/0012248 | A1 * | 1/2018 | Connelly | G06Q 30/0241 |
| 2019/0080348 | A1 * | 3/2019 | Shah | G06Q 30/0277 |
| 2020/0195652 | A1 * | 6/2020 | Carnahan | H04L 63/205 |

(Continued)

Primary Examiner — Eliyah S. Harper
(74) Attorney, Agent, or Firm — Fenwick & West LLP

(57) ABSTRACT

A system uses a contextual bandit model for query processing. The system receives, from a client device, a user query for identifying one or more items by the system. The user query is described by one or more query features. The system obtains one or more contextual features describing a context of the user query. The system applies a contextual bandit model to the query features and the contextual features to select a query processing model from a plurality of query processing models. The system applies the selected query processing model to the user query to obtain query results. The system transmits the query results for display on the client device.

16 Claims, 7 Drawing Sheets

(56) References Cited

U.S. PATENT DOCUMENTS

2020/0219028 A1* 7/2020 Papaemmanouil ............................ G06Q 10/06375
2022/0171873 A1* 6/2022 Lundbæk ............ G06F 16/9538

* cited by examiner

CONTEXTUAL BANDIT MODEL FOR QUERY PROCESSING MODEL SELECTION

BACKGROUND

In an online system, users generally provide queries to search for items or services of interest. A linear model may identify such items based solely on the self-contained query, which may include query results not particularly relevant to the user. An online system may maintain multiple disparately-trained models for performing query processing. For example, the models may have differing structures, may be trained with differing training data sets, and/or may prioritize differing objectives. Furthermore, these models may differ in complexity and efficacy in different contexts. As such, for example, utilization of one particular model may result in less relevant results to a particular user compared to results from a different model.

SUMMARY

In accordance with one or more embodiments, an online concierge system may implement a contextual bandit model to select from a multiplicity of query processing models. The query processing models may be disparately trained, e.g., with differing training data sets, with differing model architecture, with differing training algorithms, with differing objectives for optimization. For example, a first query processing model may be trained to target particular user demographics, e.g., users with a predominantly vegetarian diet (e.g., user features) searching for organic produce and dairy (e.g., retailer features). As another example, a second query processing model may be trained as a machine-learning language model. In response to receiving a user query, the online concierge system may obtain contextual features beyond the query, for example, user features, or item features, to input in addition to query features derived from the query into the contextual bandit model. The contextual bandit model selects a query processing model, which processes the query to identify query results. Selecting a query processing model by the contextual bandit model may entail outputting scores for each query processing model that indicates likelihood of optimizing reward. The query processing model with the highest score is selected by the contextual bandit model. The online concierge system displays the query results to the user (e.g., which may include transmitting the query results to display on the client device). The online concierge system may further receive a user selection from the displayed query results, which is used to tune the contextual bandit model and/or the query processing models.

In one or more embodiments, the online concierge system may implement a contextual bandit model to determine weights for a scoring function to optimize query result ranking. A user provides a query to the online concierge system. The online concierge system extracts query features from the query and obtains additional contextual features (e.g., user features, retailer features, or item features). The features are input into the contextual bandit model which outputs a weight vector comprising a weight for each ranking parameter. A ranking parameter may be a characteristic evaluated in the ranking of query results, e.g., relevance of the query result to the query, and dependability of dependability of the query result. In one or more embodiments, a query processing model processes the user query to determine the ranking parameter values for each query result (e.g., each item). The scoring function calculates a ranking score for each query result based on the ranking parameter values of the query result and the weight vector. For example, the ranking score may be a weighted sum according to the weight vector. The online concierge system displays the query results ranked according to the ranking scores. The online concierge system may further receive a user selection from the displayed query results, which is used to tune the contextual bandit model.

In one or more embodiments, the online concierge system may implement a contextual bandit model to optimize badge placements. A user provides a query to the online concierge system. The online concierge system extracts query features from the query and obtains additional contextual features (e.g., user features, retailer features, or item features). The features are input into the contextual bandit model which outputs badge parameters that constrain badge placement. The badge parameters may include how many badges to place in the display list of query results, what badges to append to the query results, how the badges are presented, etc. A badge may be an icon, or a text string indicating a particular feature of the query result. Based on the badge parameters, the online concierge system may append one or more badges to the query results. The online concierge system displays the query results with the one or more appended badges. The online concierge system may further receive a user selection from the displayed query results, which is used to tune the contextual bandit model.

Benefits of implementing the contextual bandit model are multifold. Overall, the contextual bandit model optimizes the query processing to provide optimal query results to a user improving user experience and engagement with the online concierge system. According to embodiments with selection of the query processing models, the contextual bandit model may identify optimal query processing models for processing queries in varying contexts. According to embodiments with outputting the weight vector for ranking parameters, the contextual bandit model may optimally rank the query results. According to embodiments with badge placement, the contextual bandit model may determine the set of badge parameters to promote user engagement with context-informed badges.

DETAILED DESCRIPTION

Online Concierge System Environment

Figure 1A:
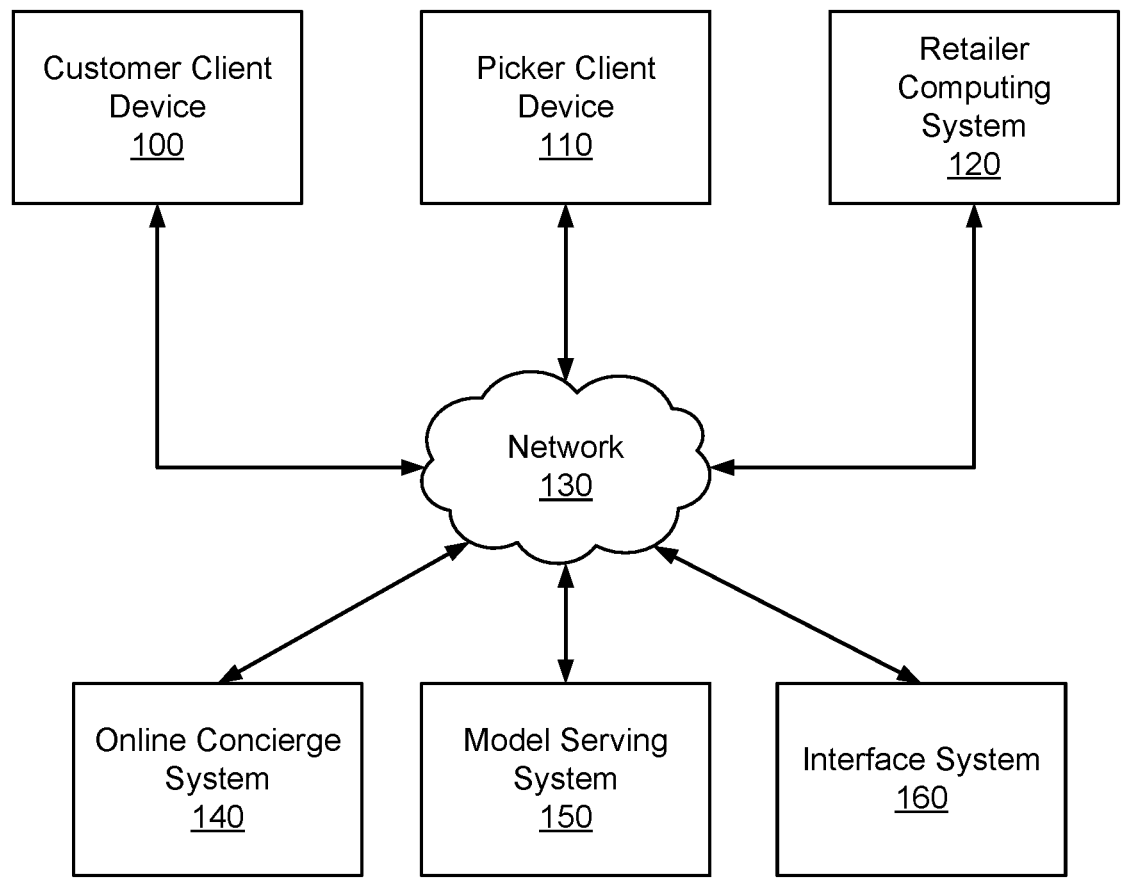
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a customer client device 100, a picker client device 110, a retailer computing system 120, a network 130, an online concierge system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good, a product, or a service that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140. To perform a search, the customer provides a query (e.g., a text query, an audio query, or a visual query) to the online concierge system 140. The online concierge system 140 processes the query to return query results to the customer. In one or more embodiments, the online concierge system 140 may implement a contextual bandit model to optimize query processing. Based on the displayed results, the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The retailer computing system 120 may provide the online concierge system 140 with retailer data describing the retailer associated with the retailer computing system 120. The retailer data may include retailer name, retailer address, retailer website, retailer phone number, other identifying information, a type of retailer, an expense class of the retailer (e.g., $, $$, or $$$), opening hours, general dependability of items, diversity of items, types of items carried, or information describing the retailer, or some combination thereof. The online concierge system 140 may further infer additional retailer data based on interactions between customers or shoppers and the retailer. For example, such retailer data based on the interactions may include customer reviews, shopper reviews, popular items ordered, dependability of items, etc.

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140.

The model serving system 150 receives requests from the online concierge system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are language models configured to perform one or more NLP tasks. The NLP tasks include, but are not limited to, text generation, query processing, machine translation, chatbots, and the like. In one or more embodiments, a language model of the model serving system 150 is configured as a transformer neural network architecture (i.e., a transformer model). Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. The language model can be configured as any other appropriate architecture including, but not limited to, transformer-based networks, long short-term memory (LSTM) networks, Markov networks, BART, generative-adversarial networks (GAN), diffusion models (e.g., Diffusion-LM), and the like.

In one or more embodiments, the task for the model serving system 150 is based on knowledge of the online concierge system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 150 and synthesizes a response to the query on the external data. While the online concierge system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
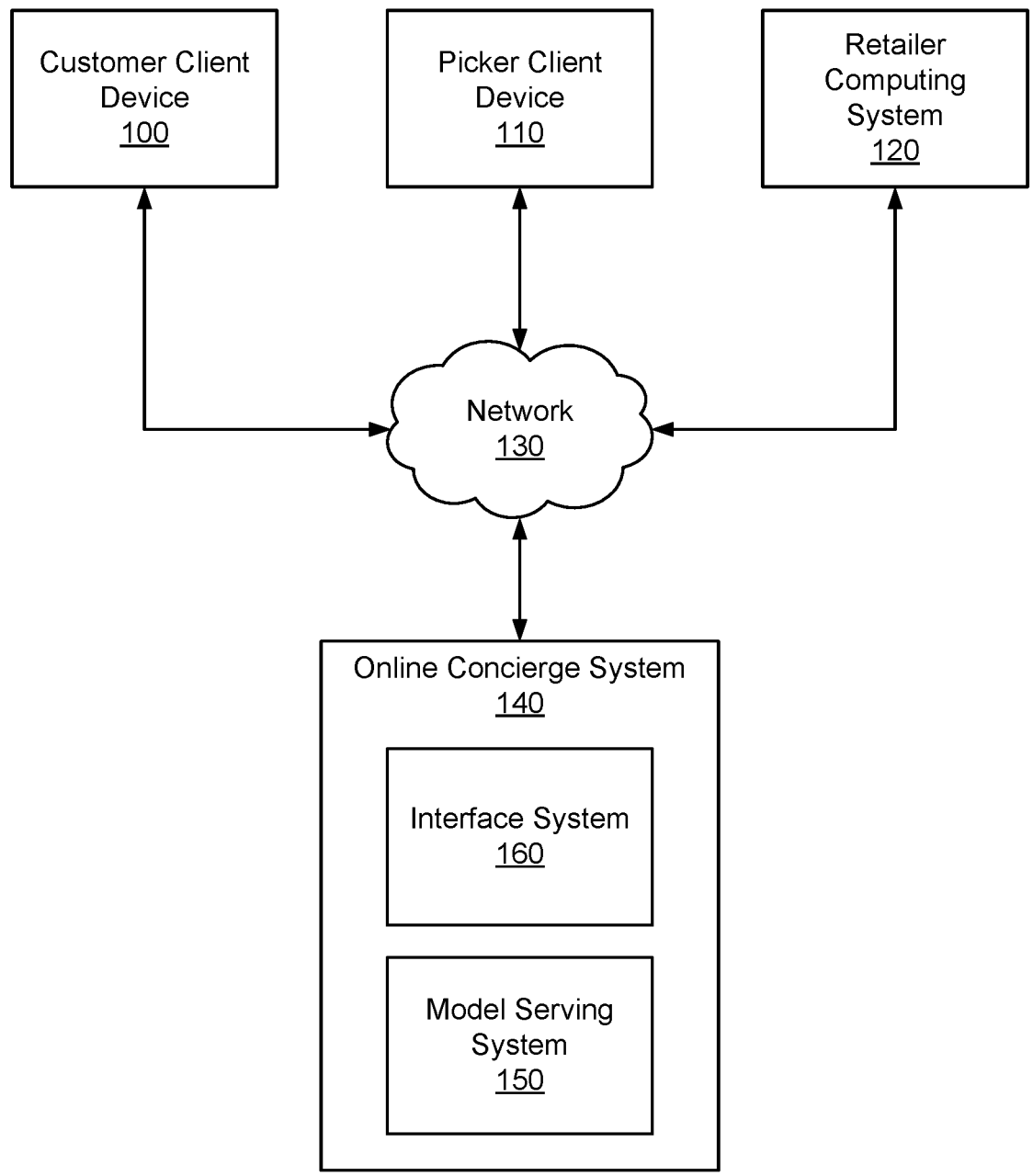
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a customer client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140. The online concierge system 140 is described in further detail below with regards to FIG. 2.

Online Concierge System Architecture

Figure 2:
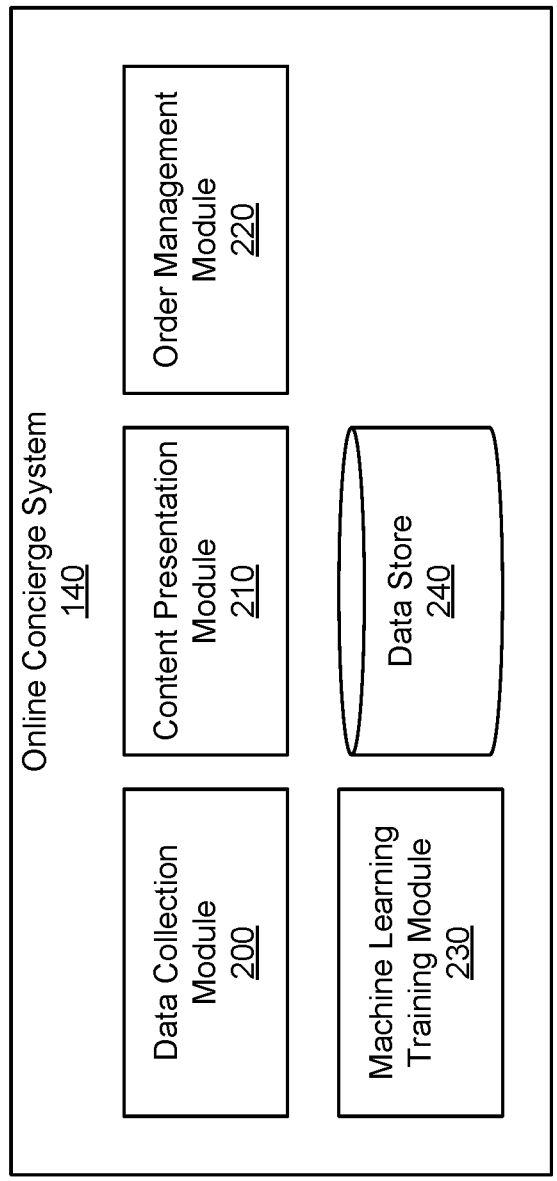
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine-learning training module 230, a data store 240, a prompt generation module 250, and a ranking module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, other demographic information (e.g., age range, family size, dietary restrictions or preferences, etc.), shopping preferences (e.g., shopping frequency, shopping magnitude, etc.), previous orders, favorite items, favorite types of items, favorite retailers, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the dependability of items in retailer locations, also referred to as "dependability." For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use a scoring function to score items for presentation to a customer. The scoring function may score items for a customer based on item data for the items and customer data for the customer. The scoring function may determine a ranking score based on ranking parameter values for each item and a weight vector. The weight vector may be output by a contextual bandit model (e.g., as further described in FIGS. 3 & 5). In some embodiments, an item selection model trained as a machine-learning model may determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 performs query processing to identify query results of items in response to a user query. The content presentation module 210 may implement a contextual bandit model to optimize the query processing. A search query may comprise text, audio signals, visual signals, or some combination thereof relating to a target item. The content presentation module 210 uses a query processing model to score items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding). In some embodiments, the content presentation module 210 may implement a contextual bandit model to select one of many query processing models to process the query (e.g., as further described in FIGS. 3 & 4). The selected query processing model may score items to determine an order (or manner) of presentation.

In some embodiments, the content presentation module 210 scores items based on dependability of one or more ranking parameters. The content presentation module 210 may determine ranking parameter values for each query result (e.g., each item). For example, ranking parameters may include: relevance of the query result to the search query, revenue gain by order of the query result, dependability of the query result, popularity of the query result, customer rating of the query result. The relevance of the query result to the search query may be determined by a query processing model. The revenue gain may be determined according to a cost to the retailer and a list price of the item. The dependability of the query result may be provided by the retailer and/or tracked by the online concierge system 140 (e.g., via the data collection module 200 and/or the order management module 220). The content presentation module 210 may use a dependability model to predict the dependability of an item. A dependability model is a machine-learning model that is trained to predict the dependability of an item at a particular retailer location. For example, the dependability model may be trained to predict a likelihood that an item is available at a retailer location or may predict an estimated number of items that are available at a retailer location. The popularity of the query result and/or the customer rating of the query result may be tracked by the online concierge system 140 (e.g., via the order management module 220). The content presentation module 210 may dependability of determine a ranking score for each query result based on the weight vector and the ranking parameter values. According to the ranking score, the content presentation module 210 may rank query results for display on the client device in response to the search query. Further details regarding the query result ranking are described in FIGS. 3 & 5).

In one or more embodiments, the content presentation module 210 may append badges to query results for display on the client device. Badges are descriptors to items that can be appended when displaying query results in response to a user query. Placement of badges may be directed according to one or more badge parameters. Badge parameters include number of badges to be placed, badges or badge types to be placed, frequency of badge placement, other parameters affective badge placement, etc. In one or more embodiments, the content presentation module 210 implements a contextual bandit model to determine a set of one or more badge parameters to optimize badge placement. Further details are described in FIGS. 3 & 6.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine-learning training module 230 trains machine-learning models used by the online concierge system 140. For example, the machine-learning training module 230 may train the item selection model, the dependability model, the query processing model(s), the contextual bandit model, or any of the machine-learned models deployed by the model serving system 150. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, retailer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

With respect to the machine-learned models hosted by the model serving system 150, the machine-learned models may already be trained by a separate entity from the entity responsible for the online concierge system 140. In one or more other embodiments, when the model serving system 150 is included in the online concierge system 140, the machine-learning training module 230 may further train parameters of the machine-learned model based on data specific to the online concierge system 140 stored in the data store 240. As an example, the machine-learning training module 230 may obtain a pre-trained transformer language model and further fine tune the parameters of the transformer model using training data stored in the data store 240. The machine-learning training module 230 may provide the model to the model serving system 150 for deployment.

Contextual Bandit Model(s) for Optimization of Query Processing

Figure 3:
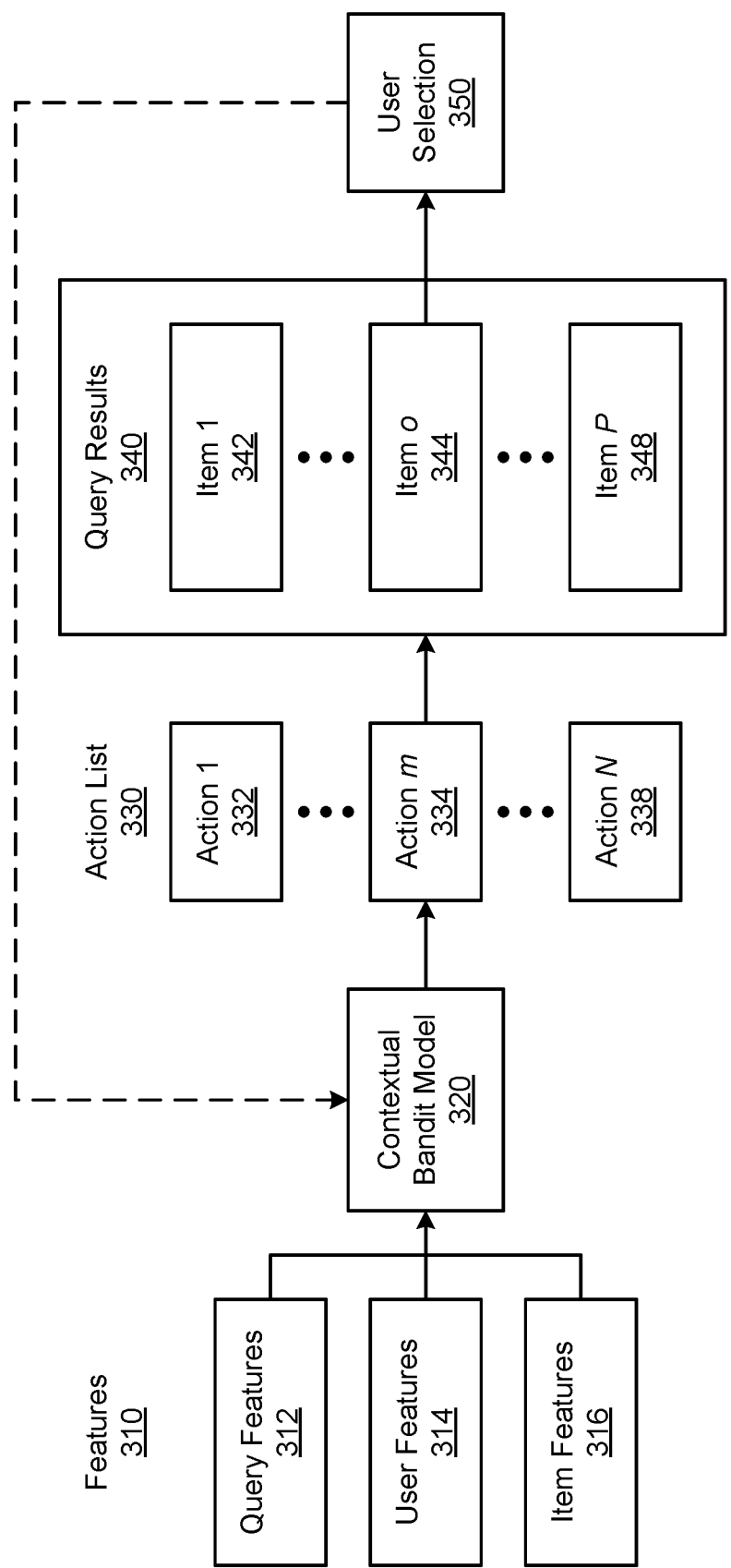
FIG. 3 illustrates a contextual bandit model for optimization of query processing, in accordance with one or more embodiments.

FIG. 3 illustrates a contextual bandit model 320 for optimization of query processing, in accordance with one or more embodiments. The contextual bandit model 320 may be a model of the online concierge system 140 and/or the model serving system 150. The contextual bandit model 320 inputs features 310 from a query and its context to output an action for optimizing query processing. Although the following description is in the perspective of the online concierge system 140, another computing system or device may perform any, some, or all of the steps described herein.

In response to receiving a query from a user, the online concierge system 140 identifies features 310 from the query and its context. The features 310 may include query features 312, user features 314, item features 316, and may further include retailer features 316. The contextual features include the user features 314, the retailer features, the item features 316, or some combination thereof. The contextual features describe a context of the query.

The query features 312 may be derived from the query. In the example of a text query or audio query, the online concierge system 140 may implement an NLP model to parse the text or the speech to identify words or phrases (e.g., tokens as described above in FIGS. 1A & 1B) in the text or the speech. Each word or phrase may be a query feature 312. In the example of an image query, the online concierge system 140 may implement an image recognition model trained to determine objects in the image query. Each object identified may be a query features 312.

The user features 314 may be derived from customer data of the user submitting the query. For example, a customer as the user is submitting a query to search for one or more items to order. The features relating to the customer may include, but are not limited to, a customer's name, address, other demographic information (e.g., age range, family size, dietary restrictions or preferences, etc.), shopping preferences (e.g., shopping frequency, shopping magnitude, etc.), previous orders, favorite items, favorite types of items, favorite retailers, stored payment instruments, session data (e.g., whether the user is shopping for a recurrent shopping list or for a particular recipe), or other data describing the customer.

The item features 316 describe one or more item(s) listed on the online concierge system 140. The item features 316 may be derived from item data, e.g., provided by the retailer(s) and/or inferred by the online concierge system 140. For example, a retailer may categorize items available for ordering and provide that category label to the online concierge system 140. Other example item data may include, but are not limited to, item cost, item price, item discount, item type, item stock, item popularity, etc. The online concierge system 140 can infer such data through interactions of customers with the online concierge system 140. For example, item popularity can be inferred through the number of customers searching for the particular item and/or number of customers ordering the particular item.

The retailer features describe one or more retailer(s) and may be derived from retailer data of the retailer(s) that are hosted by the online concierge system 140. The retailer data describing a retailer may include, but are not limited to, retailer name, retailer address, retailer website, retailer phone number, other identifying information, a type of retailer, an expense class of the retailer (e.g., $, $$, or $$$), opening hours, general dependability of items, diversity of items, types of items carried, any other information describing the retailer, customer reviews, shopper reviews, popular items ordered, dependability of items, any other information describing interactions with the retailer, or some combination thereof.

The contextual bandit model 320 inputs the features 310 and outputs Action m 334 to be taken in query processing. The contextual bandit model 320 may be a machine-learning model that identifies an action to take based on a fixed limited set of resources in order to maximize expected gain. The gain or reward in the context of query processing may be user interactions in response to the displayed query results. For example, the user selecting an item from the query list may provide a low gain. The user ordering the item may be a higher gain. The gain may also be based on the position of the item in the displayed query results, e.g., higher positions correspond to higher gain and lower positions correspond to lower gain. For example, a user ordering the first item displayed in the query results would by high gain, whereas the user ordering the $23^{rd}$ item in the query results would be low gain.

Action m 334 output by the contextual bandit model 320 is selected from an action list 330. The action list 330 includes a plurality of actions. As shown in FIG. 3, the action list 330 includes Action 1 332 through Action N 338, wherein N is a whole number greater than 1, and m is any number in the range of [1, N]. The action list 330 may be, but is not limited to: selecting from a plurality of query processing models (e.g., further described in FIG. 4), determining a weight vector for rank scoring (e.g., further described in FIG. 5), or determining badge parameters affecting badge placement (e.g., further described in FIG. 6). In one or more embodiments, the action list 330 may comprise actions in a category of actions (e.g., query processing models, weight vector for rank scoring, or badge parameters). In some embodiments, an action list may comprise actions from disparate categories of actions.

In some embodiments, the contextual bandit model 320 may be trained to select an action from each of a plurality of action lists. For example, a first action list includes a plurality of query processing models, a second action list includes a range of weight vectors for rank scoring, and a third action list is a range of badge parameters for badge placement. Accordingly, the contextual bandit model 320 may select one query processing model from the first action list, may determine a weight vector from the second action list, and may select a set of one or more badge parameter(s) from the third action list. In other embodiments, the online concierge system 140 may train a plurality of contextual bandit models, wherein each contextual bandit model may determine an action from a disparate action list. For example, a first contextual bandit model may select one query processing model from the first action list, a second contextual bandit model may determine a weight vector form the second action list, and third contextual bandit model may select a set of one or more badge parameter(s) from the third action list.

The online concierge system 140 performs Action m 334 in processing of the query to display query results 340 to the user. As part of query processing, the online concierge system 140 may process the query to identify query results related to the query. The identification may be performed by a query processing model that parses the query to determine items relevant to that query. The query processing model may determine a relevance score between items and the user query based on the query features and the item features. The query processing model may identify the query features based on the user query and the item features based on the item. The relevance score is high when the query features and the item features align or are similar and is low when the query features and the item features are dissimilar. Items above a threshold relevance score may be identified as the query results.

The online concierge system 140 may further rank the query results. For example, the online concierge system 140 determines a ranking score for each query result based on a variety of ranking parameters (e.g., relevance of the query result to the query, revenue gain by the query result, and dependability of dependability of the query result). Each item's ranking parameter values may be determined by the online concierge system 140. For example, relevance of the item to the query may be determined by a query processing model, e.g., as described above. As another example, the revenue gain by the item may be provided by the retailer or determined by the online concierge system 140 based on a differential of the cost to the retailer and the item's list price. Further, the dependability of the item may be tracked by the online concierge system 140. As orders for the item are placed and fulfilled, the online concierge system 140 can track whether shoppers had difficulty fulfilling the order with the exact item ordered, or had to find a substitute item. Other parameters such as popularity or rating by past customers may also be tracked by the online concierge system 140 as customers interact with the items. For example, popularity may be based on how many customers view or otherwise interact with an item, and rating may be based on reviews by customers that have ordered the item.

The online concierge system 140 may further modify the query results prior to display to the customer. For example, the online concierge system 140 may append one or more badges to the items. Badges may further describe the items, e.g., superlatives like "Best Seller," "Popular," "Organic," "Vegan," "High-Protein," "Low-Fat," etc. Other modifications may include modifying a manner of displaying each query result. For example, one query result may be larger than the other query results. Or, in another example, a query result's thumbnail (or icon) may display a gif or short video. As a third example, a query result may be animated.

In some embodiments, Action m 334 is the selection of one of a plurality of query processing models. The selected query processing model processes the query to return query results 340. Each query processing model may be differentially trained, e.g., with different training data sets, with different model architecture, with differing priorities or objectives, etc. In a simple example, one query processing model may be trained to prioritize savory items over sweet items. Such that, the query processing model processes a text query of "light snack" to identify more savory snack items over sweet snack items. In other embodiments, query processing models may be trained on differing contexts of the query. For example, there may be region-specific query processing models. In another example, there may be age-range-specific query processing models. In a third example, there may be diet-specific query processing models. In a fourth example, there may be retailer-specific query processing models. In a fifth example, query processing models may have varying model architectures, e.g., one trained as a neural network, another trained as a decision tree. The contextual bandit model 320 may score each of the query processing models to select one of the query processing models to maximize reward. The online concierge system 140 may display the query results 340.

In some embodiments, Action m 334 is the determination of a weight vector for calculating a ranking score for identified query results. The online concierge system 140 may determine the ranking score, for an item, based on a weighted sum of a weight vector and ranking parameter values of the item. Action m 334 may be determining the weight vector from a range of weight vectors. For example, each ranking parameter's weight may range from [0, 1]. The ranking parameter values of the item may be derived from item data. For example, as multiple customers continue to order a particular item, the online concierge system 140 may update the stock of the item, thereby affecting the ranking parameter value of dependability for that item. In another example, if a retailer chooses to discount an item, then the online concierge system 140 may update the ranking parameter value of revenue for that item to reflect decreased revenue gained by a customer ordering the item. The ranking function may be:

Ranking_Score=$w_1$*relevance+$w_2$*revenue+ $w_3$*dependability+ . . . +$w_b$*parameter$_b$ The weight vector is <$w_1$, $w_2$, $w_3$, . . . , $w_b$>, with $w_b$ as the weight any additional ranking parameter beyond the recited three. Based on the ranking score, the online concierge system 140 may rank the query results (i.e., the items identified as relevant to the query). According to the rank, the online concierge system 140 may display the query results 340, e.g., on a client device of the user.

In some embodiments, Action m 334 is the determination of a set of badge parameter(s). The badge parameters dictate badge placement. Badges can affect user selection of items from the displayed query results. For some users, badges can provide a helpful guide to the item selection process, e.g., some customers appreciate knowing which items are the most popular among other customers. For others, overplacement of badges can be distracting and overbearing, thereby frustrating the user's experience. Optimal badge placement, thus, can vary based on the context of the query. Badge parameters may include, but are not limited to, how many badges to place in the query results, what frequency, which items or types of items to place a badge, what badges or types of badges to place, etc. For example, the set of badge parameters specifies that four badges should be appended and at least half of the badges should be appended to produce items. Based on the set of badge parameter(s), the online concierge system 140 may append one or more badges (or forego appending of badges) to the query results 340 prior to display to the user.

The user may make a user selection 350 from the displayed query results 340. As shown, the query results 340 may include a plurality of items, e.g., Item 1 342, Item o 344, through Item P 348. P can be a whole number greater than one, and o can range from [1, P]. The user selection 350 may include selecting Item o 344. Selecting may include viewing Item o 344 and/or interacting with the item. Interactions may include favoriting, ordering, saving for later, etc. In some embodiments, the user selection 350 may include one or more actions taken by the user. For example, the user may browse through multiple items displayed in the query results 340, and may end up ordering one or more of items (or none of the items). All such actions may be tracked by the online concierge system 140.

Based on the user selection 350, the online concierge system 140 may determine a reward (or gain) for the overall query processing. In some embodiments, the online concierge system 140 utilizes a reward function that determines the reward value. The reward function may add or subtract value based on the various user action(s) in the user selection 350 to arrive at the reward value. For example, the reward function could add high value to the user ordering the first item displayed in the query results 340, or could add low value (or subtract value) to the user ordering the $20^{th}$ or lower-ranked item.

The online concierge system 140 trains the contextual bandit model 320 based on the determined reward from the query processing. As described above, the contextual bandit model 320 evaluates a set of actions on the action list 330 with the objective to maximize the reward gained from the query processing. As the user performs the user selection 350 and the online concierge system 140 scores the user selection 350 to determine the reward, the online concierge system 140 can update expected reward for Action m 334 that was undertaken by the online concierge system 140. The online concierge system 140 can build reward distributions for each action in the action list based on earned reward values. This yields, across varying contexts, learned reward distributions for the actions in the action list 330. As the contextual bandit model 320 is deployed, the online concierge system 140 reinforces learning and understanding of expected rewards of particular actions given the input features 310 (including the query features 312 in conjunction with some combination of the various contextual features). In one or more embodiments, the online concierge system 140 may train the contextual bandit model 320 based on historical query processing data as training data. In response to each processed query, the online concierge system 140 determines the reward for the query processing. The determined reward may inform how well the selected action from the action list 330 performed.

Figure 4:
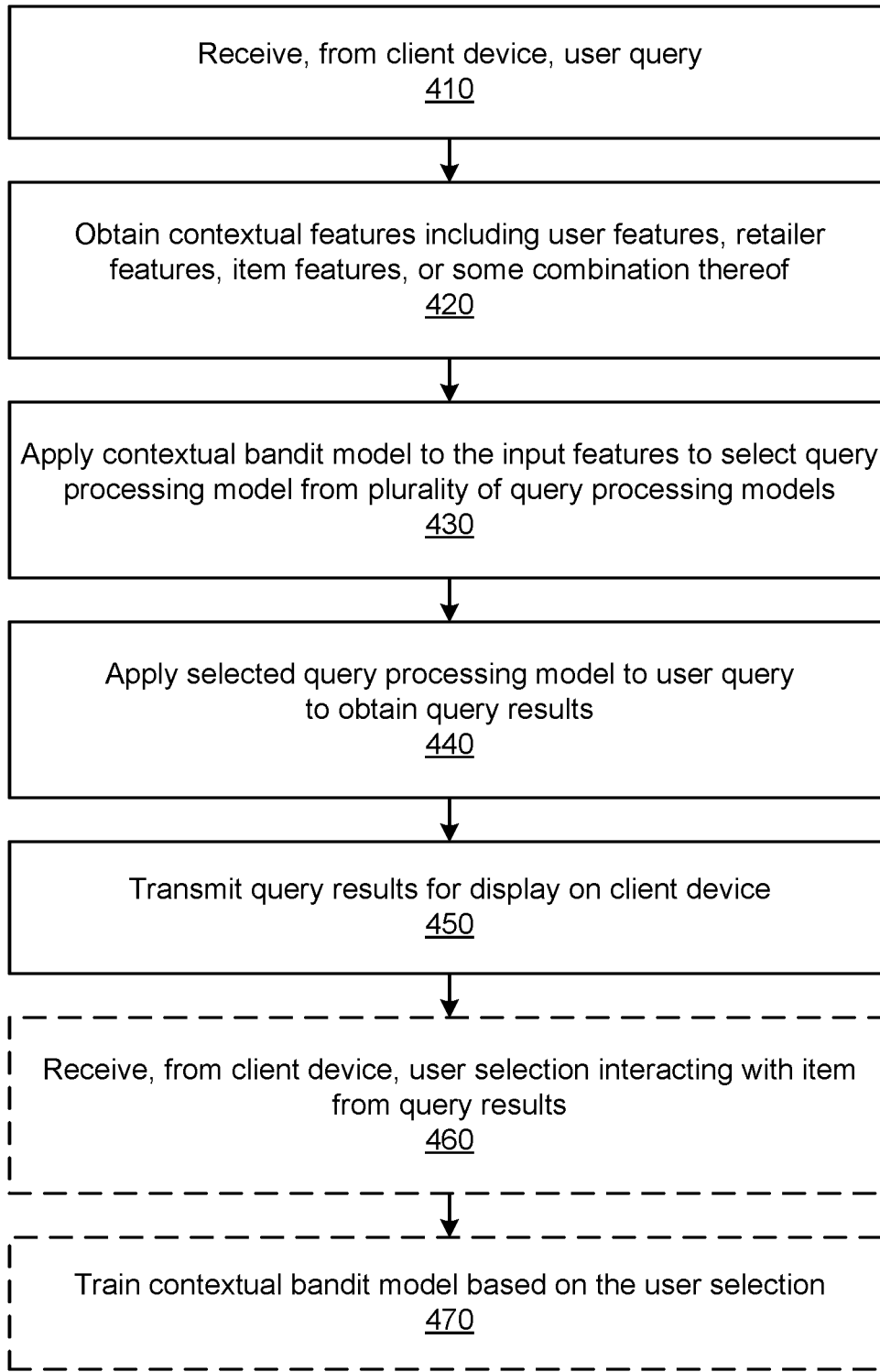
FIG. 4 is a flowchart describing query processing model selection with a contextual bandit model, in accordance with one or more embodiments.

FIG. 4 is a flowchart describing query processing model selection 400 with a contextual bandit model, in accordance with one or more embodiments. The contextual bandit model described herein is embodiment of the contextual bandit model 320 described above in FIG. 3. FIG. 4's description is in the perspective of the online concierge system 140, but in other embodiments, any computing system or device may perform any, some, or all of the steps in the query processing model selection 400.

The online concierge system 140 receives 410, from a client device, a user query. The user query may comprise text, audio signals, or visual signals. The user may provide the user query via an ordering interface. From the user query, the online concierge system 140 may extract query features describing the user query. Query features may include words identified from the text or the audio signals, phrases identified from the text of the audio signals, objects identified from the visual signals, etc.

The online concierge system 140 obtains 420 contextual features including user features, retailer features, item features, or some combination thereof. The user features are features describing the user who provided the user query to the online concierge system 140. The retailer features are features describing the retailer(s) hosted by the online concierge system 140 and from whom the user is ordering items. The item features are features describing features available for ordering on the online concierge system 140. The contextual features describe a context of the user query and include information beyond the user query.

The online concierge system 140 applies 430 a contextual bandit model to the input features to select a query processing model from a plurality of query processing models. The plurality of query processing models may be disparately trained to better tailor query processing to differing contexts of the user query. Based on the query features and the contextual features, the contextual bandit model identifies the query processing model from the plurality of query processing models that maximizes reward. In some embodiments, the contextual bandit model selects the query processing model by outputting a likelihood that the user will interact with the query results identified by the query processing model. The contextual bandit model thereafter selects the query processing model based on the likelihoods, e.g., with the highest likelihood. In some embodiments, the contextual bandit model selects the query processing model by outputting a predicted reward to the online system for query results identified by the query processing model. The contextual bandit model thereafter selects the query processing model based on the predicted rewards, e.g., the highest predicted reward. In other embodiments, the contextual bandit model may score and select the query processing models based on a combination of the likelihoods and the predicted reward.

The online concierge system 140 applies 440 the selected query processing model to the user query to obtain query results. The query processing model inputs query features from the user query to identify items that are relevant to the query features. In some embodiments, each item may have item features describing the item, and the query processing model identifies items with item features with affinity to the query features. In some embodiments, the query processing model may further rank the obtained query results based on relevance of the items to the user query. In some embodiments, the query processing model may further input the contextual features in identifying items related to the user query.

The online concierge system 140 transmits 450 the query results for display on the client device. The query results may be displayed on the ordering interface of the client device in response to the user query. The query results may be ordered according to relevance of the items to the user query. The order interface may further provide additional manners of sorting the query results (e.g., price, popularity, rating, etc.).

The online concierge system 140 may receive 460, from the client device, a user selection interacting with an item from the query results. The interaction may be viewing the item, adding the item to a shopping cart, favoriting the item, ordering the item, another action involving the item, or some combination thereof.

The online concierge system 140 may train 470 the contextual bandit model based on the user selection. Based on the user selection, the online concierge system 140 may score the reward for the query processing. Scoring may be based on a reward function that differentially values the various actions between the user's client device and the query results to generate a reward value. With the reward value, the online concierge system 140 may train the contextual bandit model with reinforcement learning. Training of the contextual bandit model may entail adjusting one or more parameters of the contextual bandit model based on the reward values and the query processing models selected by the contextual bandit model.

Figure 5:
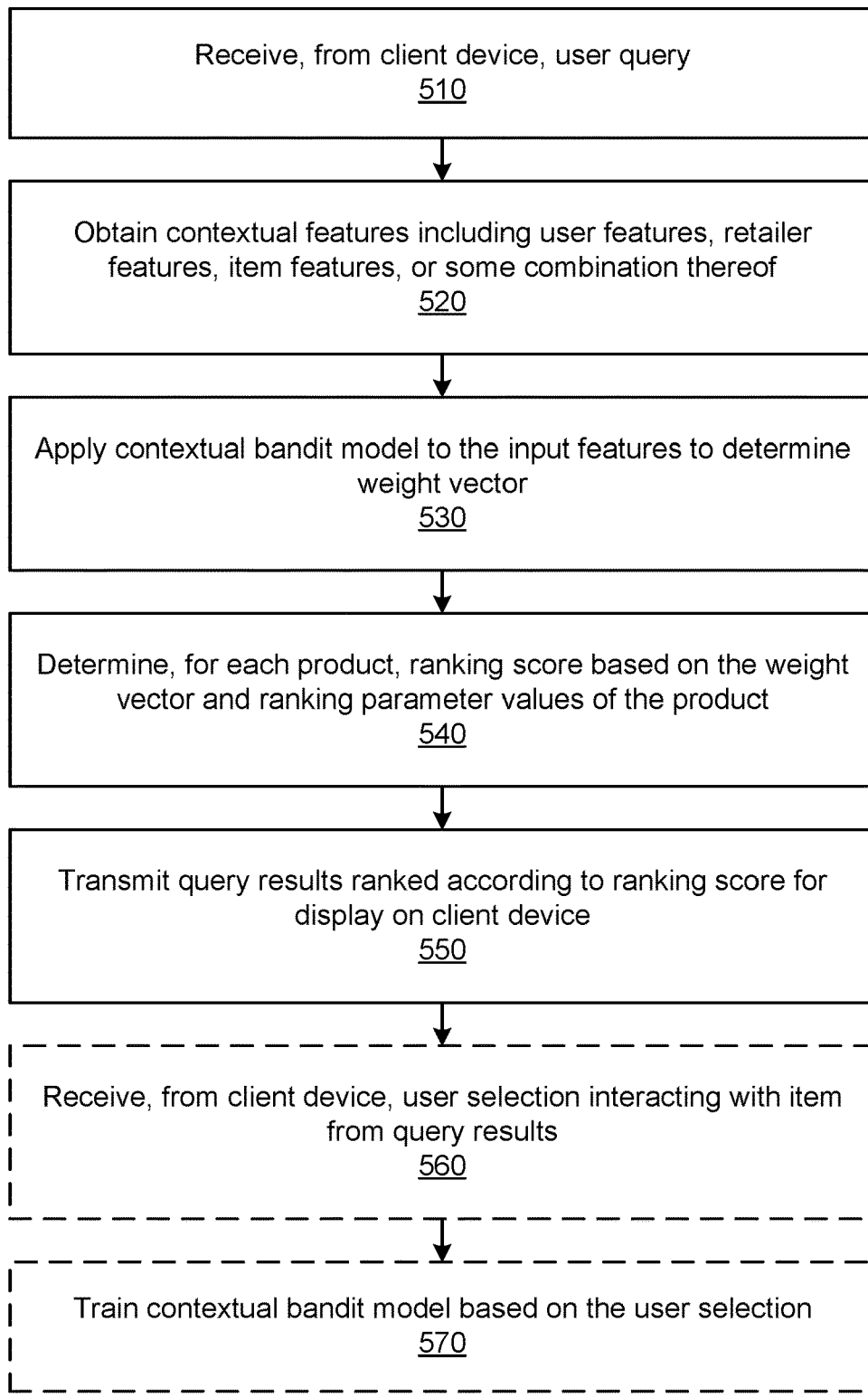
FIG. 5 is a flowchart describing query result ranking optimization with a contextual bandit model, in accordance with one or more embodiments.

FIG. 5 is a flowchart describing weight vector determination 500 for query result ranking with a contextual bandit model, in accordance with one or more embodiments. The contextual bandit model described herein is embodiment of the contextual bandit model 320 described above in FIG. 3. FIG. 5's description is in the perspective of the online concierge system 140, but in other embodiments, any computing system or device may perform any, some, or all of the steps in the weight vector determination 500.

The online concierge system 140 receives 510, from a client device, a user query. The user query may comprise text, audio signals, or visual signals. The user may provide the user query via an ordering interface. From the user query, the online concierge system 140 may extract query features describing the user query. Query features may include words identified from the text or the audio signals, phrases identified from the text of the audio signals, objects identified from the visual signals, etc.

The online concierge system 140 obtains 520 contextual features including user features, retailer features, item features, or some combination thereof. The user features are features describing the user who provided the user query to the online concierge system 140. The retailer features are features describing the retailer(s) hosted by the online concierge system 140 and from whom the user is ordering items. The item features are features describing features available for ordering on the online concierge system 140. The contextual features describe a context of the user query and include information beyond the user query.

The online concierge system 140 applies 530 a contextual bandit model to the input features to determine a weight vector for ranking of query results for display. In general, the online concierge system 140 may rank the query results using a ranking function that calculates a ranking score for each query result based on the determined weight vector and the ranking parameters values for each item. The ranking parameters are parameters that can affect ranking of the item. Example ranking parameters include relevance to the user query, revenue of the item, dependability of the item (i.e., which may factor in inventory of the item, ability of the item to be located), popularity of the item, rating of the item, etc. A query processing model may determine, for each query result, the relevance score based on the query features and the item features. A dependability model may determine, for each query result, the dependability score based on past orders of the item of the query result. The popularity of the item and/or the rating of the item may be tracked by customer interactions with the particular item. The weight vector includes a weight for each ranking parameter.

The online concierge system 140 determines 540, for each item, a ranking score based on the determined weight vector and the ranking parameter values of the item. In some embodiments, the ranking function includes a weighted sum of the ranking parameter values according to the determined weight vector. As such, for each item, the ranking score is the weighted sum between the weight vector and the ranking parameter values.

The online concierge system 140 transmits 550 the query results ranked according to the ranking scores for display on the client device. The query results may be displayed on the ordering interface of the client device in response to the user query. The order interface may further provide additional manners of sorting the query results (e.g., price, popularity, rating, etc.).

The online concierge system 140 may receive 560, from the client device, a user selection interacting with an item from the query results. The interaction may be viewing the item, adding the item to a shopping cart, favoriting the item, ordering the item, another action involving the item, or some combination thereof.

The online concierge system 140 may train 570 the contextual bandit model based on the user selection. Based on the user selection, the online concierge system 140 may score the reward for the query processing. Scoring may be based on a reward function that differentially values the various actions between the user's client device and the query results to generate a reward value. With the reward value, the online concierge system 140 may train the contextual bandit model with reinforcement learning. Training of the contextual bandit model may entail adjusting one or more parameters of the contextual bandit model based on the reward values and the determined weight vectors by the contextual bandit model.

Figure 6:
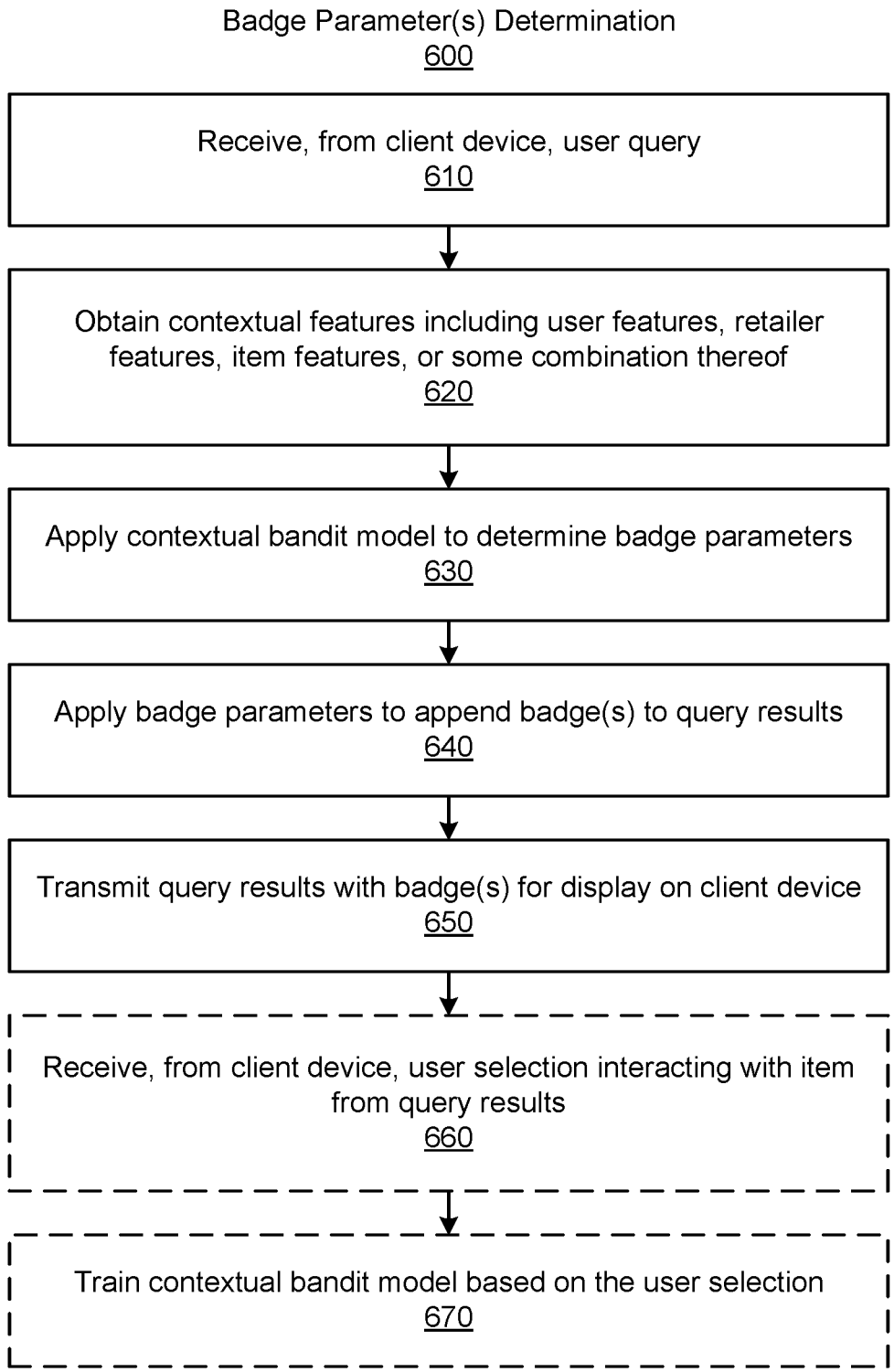
FIG. 6 is a flowchart describing badge optimization with a contextual bandit model, in accordance with one or more embodiments.

FIG. 6 is a flowchart describing badge parameter(s) determination 600 for badge placement with a contextual bandit model, in accordance with one or more embodiments. The contextual bandit model described herein is embodiment of the contextual bandit model 320 described above in FIG. 3. FIG. 6's description is in the perspective of the online concierge system 140, but in other embodiments, any computing system or device may perform any, some, or all of the steps in the badge parameter(s) determination 600.

The online concierge system 140 receives 610, from a client device, a user query. The user query may comprise text, audio signals, or visual signals. The user may provide the user query via an ordering interface. From the user query, the online concierge system 140 may extract query features describing the user query. Query features may include words identified from the text or the audio signals, phrases identified from the text of the audio signals, objects identified from the visual signals, etc.

The online concierge system 140 obtains 620 contextual features including user features, retailer features, item features, or some combination thereof. The user features are features describing the user who provided the user query to the online concierge system 140. The retailer features are features describing the retailer(s) hosted by the online concierge system 140 and from whom the user is ordering items. The item features are features describing features available for ordering on the online concierge system 140. The contextual features describe a context of the user query and include information beyond the user query.

The online concierge system 140 applies 630 a contextual bandit model to the input features to determine a set of badge parameter(s). The online concierge system 140 may perform query processing on the user query to obtain one or more query results (e.g., via one or more of the query processing models). Prior to displaying, the online concierge system 140 may append one or more badges to the query results. The set of one or more badge parameters inform badge placement by the online concierge system 140. Badge parameters may include: number of badges, badges or types of badges to display, frequency of placement, etc.

The online concierge system 140 applies 640 the set of badge parameter(s) to append one or more badges to the query results. For example, if one badge parameter indicates a number of badges, the online concierge system 140 may append that number of badges to the query results. As another example, if another badge parameter specifies a particular type of badge to place, then the online concierge system 140 may append badges of that type of badge.

The online concierge system 140 transmits 650 the query results with the appended badge(s) for display on the client device. The query results may be displayed on the ordering interface of the client device in response to the user query. The order interface may further provide additional manners of sorting the query results (e.g., price, popularity, rating, etc.).

The online concierge system 140 may receive 660, from the client device, a user selection interacting with an item from the query results. The interaction may be viewing the item, adding the item to a shopping cart, favoriting the item, ordering the item, another action involving the item, or some combination thereof.

The online concierge system 140 may train 670 the contextual bandit model based on the user selection. Based on the user selection, the online concierge system 140 may score the reward for the query processing. Scoring may be based on a reward function that differentially values the various actions between the user's client device and the query results to generate a reward value. With the reward value, the online concierge system 140 may train the contextual bandit model with reinforcement learning. Training of the contextual bandit model may entail adjusting one or more parameters of the contextual bandit model based on the reward values and the determined set of badge parameter(s) by the contextual bandit model.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor may comprise one or more subprocessing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method comprising:
   receiving, from a client device, a user query for identifying one or more items by an online system, the user query described by one or more query features;

obtaining one or more contextual features describing a context of the user query, wherein the one or more contextual features comprises:
  user features describing a user associated with the client device;
  retailer features describing one or more retailers hosted by the online system; and
  item features describing one or more items listed on the online system; and
applying a contextual bandit model to the query features and the contextual features to select a query processing model from a plurality of query processing models wherein applying the contextual bandit model, further comprises:
  outputting, for each query processing model, a predicted reward to the online system for query results identified by the query processing model; and
  selecting the query processing model from the plurality of query processing models based on the predicted rewards; and
applying the selected query processing model to the user query to obtain query results; and
transmitting the query results for display on the client device.

2. The computer-implemented method of claim 1, wherein receiving the user query comprises receiving one or more of: text, audio signals, or visual signals.

3. The computer-implemented method of claim 2, further comprising:
  extracting the one or more query features from the user query with one or more of: a natural language processing model, a speech recognition model, or an image recognition model.

4. The computer-implemented method of claim 1, wherein the query processing models are disparately trained.

5. The computer-implemented method of claim 1, wherein
  applying the contextual bandit model to the query features and the contextual features to select the query processing model from the plurality of query processing models further comprises:
  outputting, for each query processing model, a likelihood that the user will interact with the query results identified by the query processing model;
  wherein selecting the query processing model from the plurality of query processing models is further based on the likelihoods.

6. The computer-implemented method of claim 1, wherein applying the selected query processing model comprises:
  applying the selected query processing model to the user query and the contextual features to obtain the query results.

7. The computer-implemented method of claim 1, further comprising:
  ranking the query results based on relevance to the user query, wherein displaying the query results is based on the ranking.

8. The computer-implemented method of claim 1, further comprising:
  receiving, from the client device, a user selection interacting with an item from the query results.

9. The computer-implemented method of claim 8, wherein the user selection comprises at least one of:
  viewing an item from the query results;
  adding the item to a shopping cart;
  favoriting the item; or
  ordering the item.

10. The computer-implemented method of claim 8, further comprising:
  scoring a reward based on the user selection; and
  training the contextual bandit model based on the reward.

11. A non-transitory computer-readable storage medium storing instructions that, when executed by a computer processor, cause the computer processor to perform operations comprising:
  receiving, from a client device, a user query for identifying one or more items by an online system, the user query described by one or more query features;
  obtaining one or more contextual features describing a context of the user query, wherein the one or more contextual features comprises:
    user features describing a user associated with the client device;
    retailer features describing one or more retailers hosted by the online system; and item features describing one or more items listed on the online system;
  applying a contextual bandit model to the query features and the contextual features to select a query processing model from a plurality of query processing models, wherein applying the contextual bandit model, further comprises:
    outputting, for each query processing model, a predicted reward to the online system for query results identified by the query processing model; and
    selecting the query processing model from the plurality of query processing models based on the predicted rewards; and
  applying the selected query processing model to the user query to obtain query results; and
  transmitting the query results for display, on the client device.

12. The non-transitory computer-readable storage medium of claim 11, wherein receiving the user query comprises receiving one or more of: text, audio signals, or visual signals.

13. The non-transitory computer-readable storage medium of claim 12, the operations further comprising:
  extracting the one or more query features from the user query with one or more of: a natural language processing model, a speech recognition model, or an image recognition model.

14. The non-transitory computer-readable storage medium of claim 11, wherein the query processing models are disparately trained.

15. The non-transitory computer-readable storage medium of claim 11, wherein applying the contextual bandit model to the query features and the contextual features to select the query processing model from the plurality of query processing models further comprises:
  outputting, for each query processing model, a likelihood that the user will interact with the query results identified by the query processing model;
  wherein selecting the query processing model from the plurality of query processing models is further based on the likelihoods.

16. A system comprising:
  a computer processor; and
  a non-transitory computer-readable storage medium storing instructions that, when executed by the computer processor, cause the computer processor to perform operations comprising:

receiving, from a client device, a user query for identifying one or more items by the system, the user query described by one or more query features;

obtaining one or more contextual features describing a context of the user query, wherein the one or more contextual features comprises:
  user features describing a user associated with the client device; retailer features describing one or more retailers hosted by the online system; and item features describing one or more items listed on the online system; and
  applying a contextual bandit model to the query features and the contextual features to select a query processing model from a plurality of query processing models wherein applying the contextual bandit model, further comprises:
    outputting, for each query processing model, a predicted reward to the online system for query results identified by the query processing model; and
    selecting the query processing model from the plurality of query processing models based on the predicted rewards; and applying the selected query processing model to the user query to obtain query results; and transmitting the query results for display on the client device.

* * * * *